United States Patent
Gabrys

(10) Patent No.: US 7,411,325 B1
(45) Date of Patent: Aug. 12, 2008

(54) HIGH EFFICIENCY COMBINATION MOTOR AND DRIVE

(75) Inventor: Christopher W. Gabrys, Reno, NV (US)

(73) Assignee: Revolution Electric Motor Company, Inc., Reno, NV (US)

(*) Notice: Subject to any disclaimer, the term of this patent is extended or adjusted under 35 U.S.C. 154(b) by 418 days.

(21) Appl. No.: 11/255,430

(22) Filed: Oct. 20, 2005

Related U.S. Application Data

(60) Provisional application No. 60/620,587, filed on Oct. 20, 2004.

(51) Int. Cl.
*H02K 11/00* (2006.01)

(52) U.S. Cl. .................. 310/68 R; 310/265; 310/268; 310/254

(58) Field of Classification Search .......... 310/265–266, 310/268, 216, 179–180, 254, 261, 156.32; 318/721, 723, 803, 227
See application file for complete search history.

(56) References Cited

U.S. PATENT DOCUMENTS

| | | | | |
|---|---|---|---|---|
| 5,172,020 A | | 12/1992 | Hibino | 310/26 |
| 5,311,092 A | * | 5/1994 | Fisher | 310/266 |
| 5,402,054 A | | 3/1995 | Eckersley | 318/801 |
| 5,619,087 A | * | 4/1997 | Sakai | 310/268 |
| 5,723,933 A | | 3/1998 | Griindl | 310/266 |
| 5,744,896 A | | 4/1998 | Kessinger, Jr. | 310/268 |
| 5,909,098 A | | 6/1999 | Konecny | 318/811 |
| 6,211,635 B1 | * | 4/2001 | Kambe et al. | 318/400.11 |
| 6,339,265 B1 | | 1/2002 | Levin | 307/407 |
| 6,388,416 B1 | * | 5/2002 | Nakatani et al. | 318/700 |
| 6,531,799 B1 | * | 3/2003 | Miller | 310/114 |
| 6,531,842 B2 | | 3/2003 | LeDoux | 318/629 |
| 6,580,247 B2 | * | 6/2003 | Nakazawa | 318/700 |
| 6,803,691 B2 | * | 10/2004 | Rose | 310/156.32 |
| 6,891,302 B1 | * | 5/2005 | Gabrys | 310/178 |
| 7,053,587 B2 | * | 5/2006 | Ito et al. | 318/801 |
| 7,109,625 B1 | * | 9/2006 | Jore et al. | 310/198 |
| 2004/0145270 A1 | * | 7/2004 | Haydock et al. | 310/268 |

* cited by examiner

*Primary Examiner*—Thanh Lam
(74) *Attorney, Agent, or Firm*—J. Michael Neary

(57) ABSTRACT

A brushless permanent magnet motor has a rotor constructed of spaced ferromagnetic backirons and a circumferential array of alternating polarity magnetic poles that drive magnetic flux back and forth across an armature air gap between the backirons. A stator includes an air core armature in the air gap with three-phase windings. An inverter includes a pulse-modulated semiconductor H-bridge that switches and regulates power to the three-phase windings to drive the rotor. Harmonic losses in the motor caused by ripple currents generated by the higher pulse switching frequency in electronic variable speed drives, due to the inherently lower inductance of air core motors, are substantially reduced by adding serial inductance between the motor and drive. The H-bridge is serially electrically connected to the three-phase armature windings through three inductors that employ a low cost powder core. Each of the inductors provides an inductance that is greater than twice the value of the leg inductance of the three-phase windings.

20 Claims, 8 Drawing Sheets

HIGH EFFICIENCY COMBINATION MOTOR AND DRIVE

This is related to Provisional Application No. 60/620,587 entitled "High Efficiency Brushless Motors" filed on Oct. 20, 2004.

This invention pertains to electric motors and more particularly to a motor drive system that provides increased efficiency for reducing operating electricity costs while also having minimized construction costs.

BACKGROUND OF THE INVENTION

There is a demand for new motor drive systems for converting between electrical and mechanical energy, which have both high operating efficiency and minimized construction costs. One method for creating increased efficiency motors is to utilize a construction having permanent magnet excitation, along with an air core armature. Air core armatures contain their windings in the magnetic air gap of the motor instead of within slots in a laminated steel stator. Permanent magnets drive the flux across the air gap. This construction affords a reduction in eddy current and hysteresis losses in the stator, but it also entails an increased magnetic air gap. Unlike induction or asynchronous type motors, permanent magnet motors are synchronous and typically cannot line start. They must therefore be driven by a variable speed motor drive inverter that ramps up the speed from stopped. Because of the combined operation of motor and electronic drive, each component cannot be satisfactorily designed for maximum performance alone. A new drive system for motor and variable speed drive combination having increased efficiency, while also minimizing costs, is needed.

SUMMARY OF THE INVENTION

The invention provides a high efficiency combination motor and drive system for converting between electrical and mechanical energy that provides greater efficiency and minimized costs. The drive comprises a brushless permanent magnet motor that has a rotor and a stator, and an electronic drive inverter that drives the motor by providing synchronous AC power to the stator. The rotor is constructed of a ferromagnetic backiron and a circumferential array of alternating polarity magnetic poles that drive magnetic flux back and forth across an armature air gap in the motor. To reduce motor losses, the stator includes an air core armature with three-phase windings comprised of bundled multiple individually insulated strand conductor wire. The windings are assembled together in a substantially non-ferromagnetic structure that is located in the armature air gap, whereby alternating magnetic flux from the alternating polarity magnetic poles passes through the windings as the rotor rotates. The air core motor is compatible for both axial and radial magnetic gap configurations. In a radial gap configuration, the alternating polarity magnetic poles employ radial magnetizations and the windings traverse axially in the armature air gap.

Despite both the large magnetic air gap in the air core motor and the production of the majority of flux by permanent magnets, I have found, surprisingly, that electronic variable speed drives still cause some harmonic losses in the motor. One cause for the harmonic losses is the use of a higher pulse switching frequency for regulation due to the inherently lower inductance of air core motors. The inductance of air core motors can be more than 1000 times less than conventional motors. The higher switching frequency of the electronic drive required for the low inductance of the air core motors, which may be up to 50 kHz, results in greater rotor harmonic losses for a given ripple current. I have found that the losses in the combination can be substantially reduced by reducing the ripple current with the use of added specially designed serial inductance between the motor and drive, thereby reducing the harmonic losses in the motor.

Conventional slot wound motors have sometimes utilized reactors to add serial inductance with the motor and a variable speed drive. The purpose of these reactors is to limit the rise in current and voltage caused from impedance mismatching for installations with long lengths between the drive and motor causing high voltage spikes that degrade the motor winding insulation life. This use of added serial inductance is opposite the air core motor and drive system. The air core motor has as much as 1000 times lower inductance than a conventional motor and does not suffer the severe impedance mismatch. Instead the air core motor has a very low inductance, opposite the conventional motor, and the serial inductors are added in contrary function to reduce the ripple current caused by the very low inductance and increasing the total system efficiency. In conventional motors, reflected voltage waveforms are a function of the switching time of the drive and the length of cable between the drive and high inductance of the motor. The cable acts as a transmission line with an impedance mismatch at the end. This mismatch causes the leading edge of the high frequency PWM waveform to be reflected back in the direction to the drive. When these waveforms collide, the leading edge waveforms add together causing voltage overshoot spikes. On a 480 VAC system, it is common to find voltage spikes for conventional motors of 1200-1500 volts at the motor, which would reduce the motor winding life. In contrast with a slot wound motor, air core motors do not have this impedance mismatch or suffer this problem.

The inverter includes a pulse modulated semiconductor H-bridge that switches and regulates power to the three-phase windings to accelerate the rotor. The H-bridge is serially electrically connected to the three-phase armature windings through three inductors, and particularly inductors that employ a powder core, contrary to the known more expensive, high performance tape wound cores. Tape wound cores are known to have extremely low hysteresis losses and with thin tape for the winding construction they can also provide very low eddy current losses. However, we have found that use of a low cost powder core actually provides significantly higher efficiency in the variable speed drive and air core motor system. The problems for the tape wound core arises from the simultaneous requirements specific for the air core motor and switching drive combination. The added inductors must have sufficient inductance but must also not saturate with the applied motor current levels. This combination has been found to cause tape cores to saturate. To prevent saturation, a gap is added. Unfortunately, the discrete gap causes very high gap induced losses because of the high frequency required for the drive switching for operating the low inductance air core armature. The powder core distributes the air gap in an effective air gap around the circumference of the toroid inductor such that no large discrete gaps are required and losses incurred. Preferably a toroid having a complete closed flux loop is utilized for the inductor core. Each of the inductors must provide an inductance that is greater than the value of the leg inductance of the three-phase windings. More preferably, the inductors provide an inductance that is more than twice the leg inductance. These added inductors provide total inductance that is still many times lower (100 times lower in many cases) than a conventional motor, however the added inductance is several times higher (5-10 times in many cases) than an air core motor alone.

These added inductors are introduced to make up for inductance that is lacking in an air core motor, but they also introduce their own new losses. From a lay perspective, it would seem that adding the separate inductance would cause no net improvement in combination efficiency over a conventional motor and variable speed drive, however I have found that in fact a substantial efficiency increase with this combination can be achieved. The inductors, as specified can provide for very low total losses. One reason is that the powder cores provide significantly lower core losses, much lower loss than would be practical or economical for the stator core in an actual conventional motor. These inductors have the special requirements of a high current capability with high inductance and simultaneously must have low losses to the higher pulse switching frequency ripple for an air core motor. I have found that the requirements of the high current with the high inductance require a gapped core for available magnetic materials to prevent saturation. However, I have also found that this gap results in substantial gap induced losses that are incompatible with the goals of the combined motor and electronic drive. These losses would negate any of the efficiency gains being sought. To eliminate these gap losses, a powder core, which has an effective distributed gap, has been found to overcome the gap fringing losses. The inductors on this type of core are effective for these drives and air core motors to provide the adequate efficiency, inductance and power capability. The inductors cooperate to increase the total efficiency of the combination motor and electronic variable speed drive by reducing the harmonic losses generated in the rotor.

In a preferred embodiment, the inductors utilize a toroid core for the lowest losses. Additionally, the toroid is preferably constructed of iron powder in a resin binder. This type of core has been found to have properties compatible with the drive system while also having low cost. Cost is reduced by eliminating the sintering in the manufacturing that is used in typical powder cores and replacing that with a resin bond construction instead.

It is the goal of the system to reduce harmonic losses through efficiently lowering the peak value of the ripple current. Reducing the ripple current results in inductor losses, with the greater reduction having higher losses. Likewise, the smaller the ripple current, the higher is the sole motor efficiency. In yet an additional preferred embodiment, the inductors cause the full load peak value of ripple current to lie between $\frac{1}{4}^{th}$ and $\frac{1}{12}^{th}$ of the peak value of the synchronous AC power current. The ripple current from the H-bridge switching preferably occurs at a frequency between 5 kHz and 50 kHz. Low frequencies reduce the drive switching losses but result in undesirably high ripple current peak values. Likewise, ripple current peak values can be made low at higher frequencies, but the drive switching losses become too large at higher frequencies. Although several possible variable speed inverter commutation methods can be employed with the drive, the greatest reliability can be achieved by eliminating rotary position sensors. As a result, the inverter preferably employs sensorless flux vector control to provide the commutation of the synchronous AC power.

For the highest possible efficiency motor drive system, it is preferable to construct the motor with a double rotating construction, whereby the air core armature is located within a magnetic air gap formed between two co-rotating parts of the rotor. In this construction, the air core armature is in an air gap bounded on both sides by rotating surfaces of the rotor. This motor construction eliminates magnetically induced losses in the back irons because the whole magnetic flux path rotates with the rotor. No steel portions are subjected to a circumferentially time varying flux during operation of the motor. As a result no electrical laminated steel stator components are used. Double rotating air core motor constructions require a larger magnetic air gap for placement of the armature windings. However, we have found that for high efficiency applications, the added costs for an increased magnetic air gap can be overcome by the energy saving afforded through the construction, and in particular with the drive and inductor combination provided.

Motors made in accordance with this invention will find wide application in high efficiency commercial motors, as well as motor-generators for converting mechanical power to electrical power and for converting electrical power to electrical power. Such applications include flywheel energy storage systems and regenerative braking systems for vehicles.

DESCRIPTION OF THE DRAWINGS

The invention and its many advantages and features will become better understood upon reading the following detailed description of the preferred embodiments in conjunction with the following drawings, wherein.

DESCRIPTION OF THE PREFERRED EMBODIMENT

Figure 1:
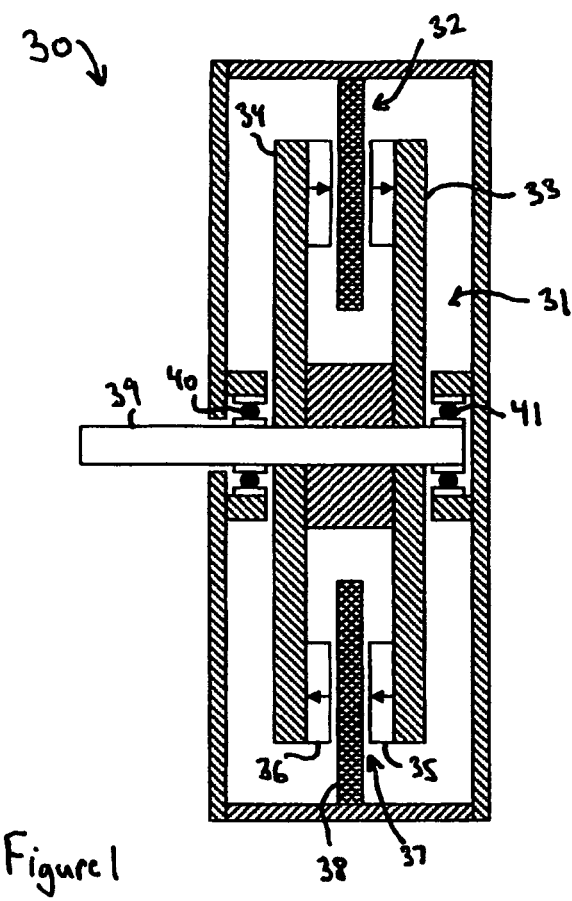
FIG. 1 is a schematic drawing of a brushless axial gap air core permanent magnet motor for use in accordance with the invention.

Turning to the drawings, wherein like reference characters designate identical or corresponding parts, FIG. 1 shows a brushless axial gap permanent magnet motor 30 having a rotor 31 mounted for rotation relative to a stationary stator 32. The rotor 31 is comprised of two co-rotating steel discs 33, 34 that are attached to a central shaft 39, which is journalled for rotation in bearings 40, 41. The discs 33, 34 have circumferential arrays of alternating polarity magnetic poles 35, 36 that drive magnetic flux back and forth across an axial air gap 37. The discs 33, 34 function as backirons to conduct flux circumferentially between adjacent magnets 35, 36 to complete the flux loops. Located in the magnetic air gap 37 is a stationary disc-shaped air core armature 38. The armature 38 has three-phase windings comprised of bundled multiple individually insulated strand conductor or Litz wire. These strands reduce the eddy currents that would otherwise occur in the solid windings. Strands can be round, rectangular or a stack of properly oriented ribbon wires. These wires are electrically in parallel for low resistance but are electrically insulated along their length inside the magnetic air gap to preclude generation of significant eddy current losses. Although solid conductor wire can be used for lower costs, it is generally undesirable to do so in most cases because of the higher losses. The armature windings are assembled together in a substantially non-magnetic structure to form the armature 38. One such structure is shown in detail in U.S. patent application Ser. No. 11/207,374 for "High Performance Air Core Motor-Generator Winding" filed on Aug. 18, 2005, (the disclosure of which is incorporated herein by reference). Alternating flux from the magnetic poles 35, 36 pass through the windings as the rotor 31 rotates, and interacts with the flux generated in the armature windings to produce torque on the rotor 31.

Figure 2:
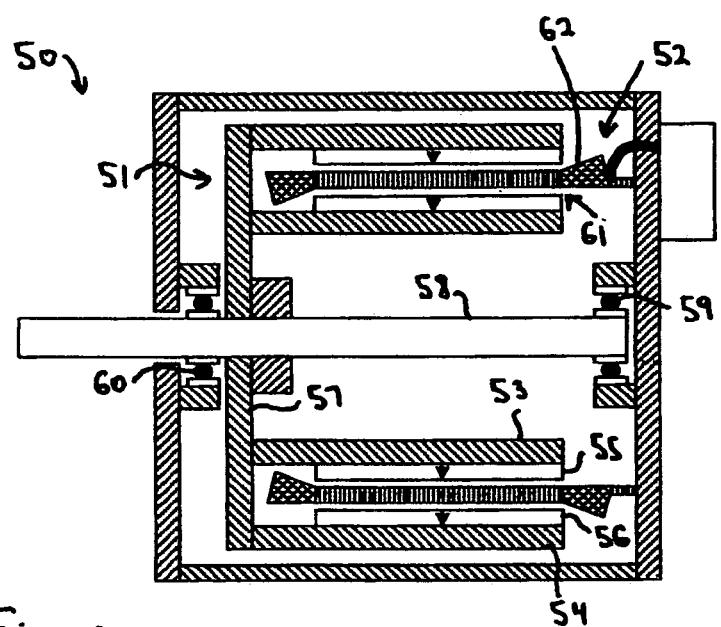
FIG. 2 is a schematic drawing of a brushless radial gap air core permanent magnet motor for use in accordance with the invention.

An alternate configuration brushless air core permanent magnet motor for use in accordance with the invention is shown in FIG. 2. This motor utilizes a radial gap construction. The radial gap construction has been found to require more magnet material for the same power and efficiency performance compared to an axial gap air core motor. However, the radial gap motor is ideally suited for widespread commercialization because the radial magnetic air gap design can utilize the NEMA standard motor diameter and hence can have the standard shaft height for easier customer replacement installation. The radial gap air core motor with radial magnetizations is very well suited to take advantage of the high total system efficiency afforded by the drive, motor and inductor combination. The motor 50 includes a rotor 51 mounted for rotation relative to a fixed stator 52. The rotor 51 is constructed of inner and outer steel tubes 53, 54 with circumferential arrays of alternating polarity magnetic poles that drive magnetic flux back and forth across a radial magnetic air gap 61. The steel tubes 53, 54 function as backirons to conduct flux circumferentially between adjacent magnets to complete the flux loops. The tubes 53, 54 are attached to a central shaft 58 by a hub plate 57. The shaft 58 is journalled for rotation by bearings 59, 60. Located in the radial air gap 61 is a cylindrical air core armature 62. The armature 62 has three-phase windings comprised of bundled multiple individually insulated strand conductor or Litz wire to reduce eddy current losses in the armature. The windings are assembled together in a substantially non-magnetic structure to form the armature 62. One preferred technique for making the armature is shown in an application filed concurrently with this application, entitled Improved Air Core Motor-Generator, the disclosure of which is incorporated herein by reference.

Figure 3:
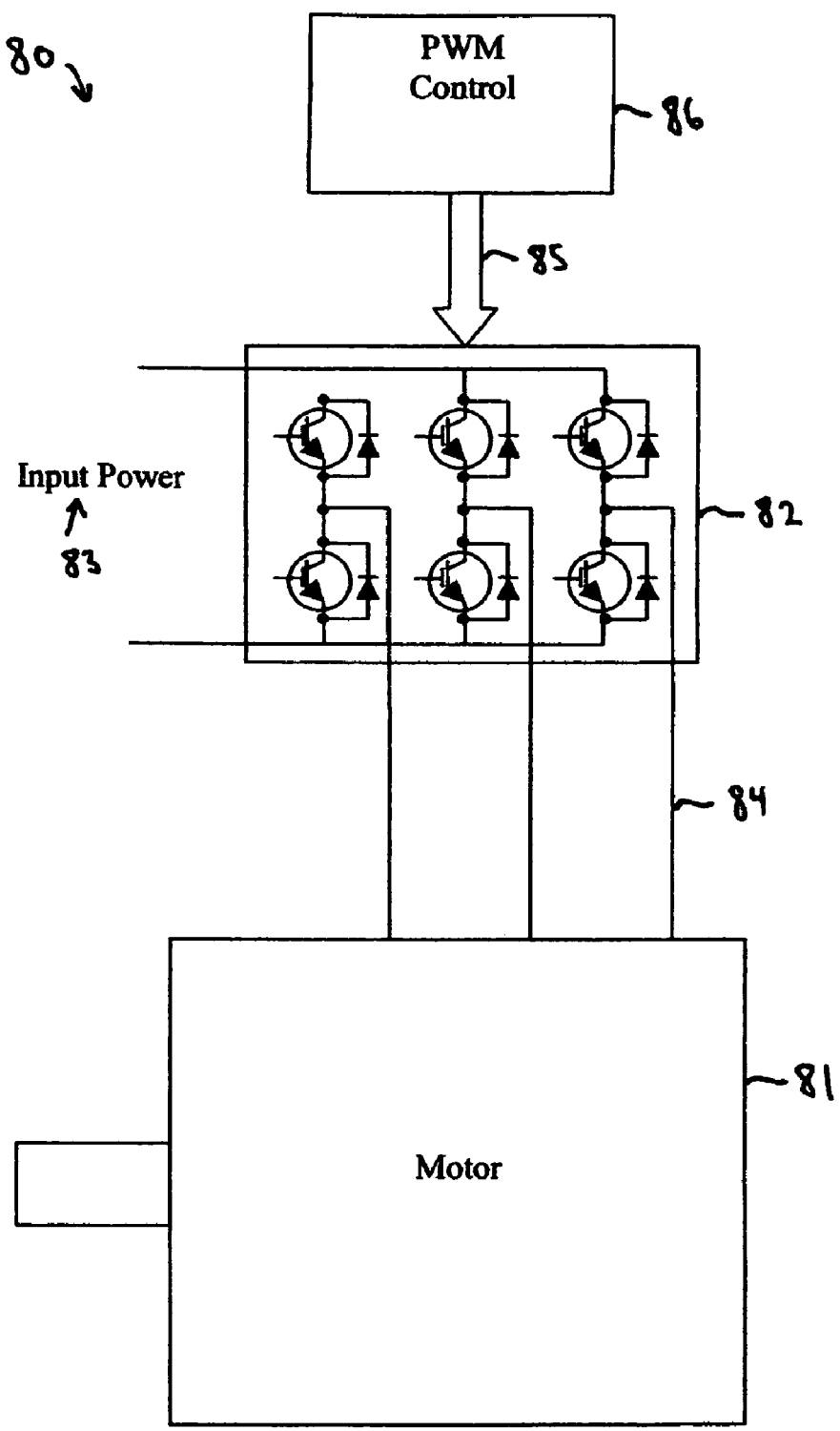
FIG. 3 is a schematic drawing of a combination motor and electronic variable speed drive not in accordance with the invention.

A combination motor and electronic variable speed drive not in accordance with the invention is shown in FIG. 3. The drive system 80 comprises a brushless permanent magnet air core motor 81 that is powered by input power 83. The input power 83 is coupled to a variable speed drive 82 that employs an H-bridge electronic switching topology as shown. The drive inverter 82 converts the input power 83 to synchronous 3-phase power 84 to supply to the motor 81 and its armature windings. Commutation and control 85 is supplied to the H-bridge 82 by a commutation and control board. Although this motor and drive combination does function by operating the motor, it has been found that the total efficiency of the combination is less than predicted.

Figure 4:
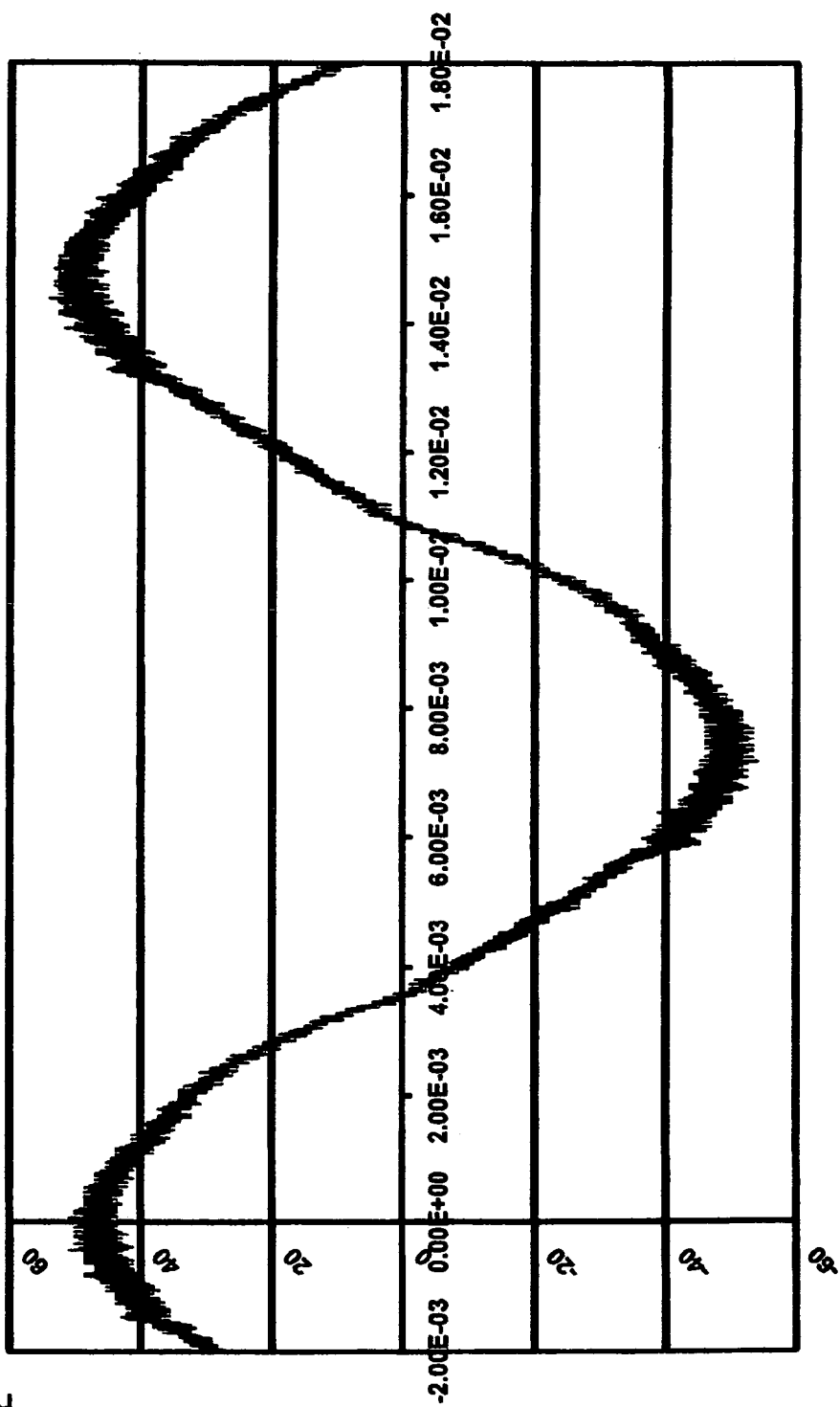
FIG. 4 is a graph showing the current waveform from electronic variable speed drive to an air core permanent magnet motor.

The current waveform from electronic variable speed drive to an air core permanent magnet motor is shown in FIG. 4. Because of the substantially lower phase inductance of an air core motor, resulting from the large air gap, the pulse width modulation frequency must be increased, in some cases from less than 5 kHz to over 20 kHz. The switching at this frequency results in a much higher frequency ripple current to the armature windings on top of the synchronous sinusoidal power, as shown. The low inductance of the armature additionally does not appreciable smooth this ripple. As a result, a larger and higher frequency ripple current is present in the armature windings than conventional motors. Surprising, despite the large magnetic air gap and large permanent magnet poles which produce the majority of the motor magnetic flux, this ripple is sufficient to induce some harmonic losses in the rotor which were thought to be precluded. Although smaller than in a conventional motor, they still reduce the efficiency of the combined motor and variable speed drive system undesirably.

Figure 5:
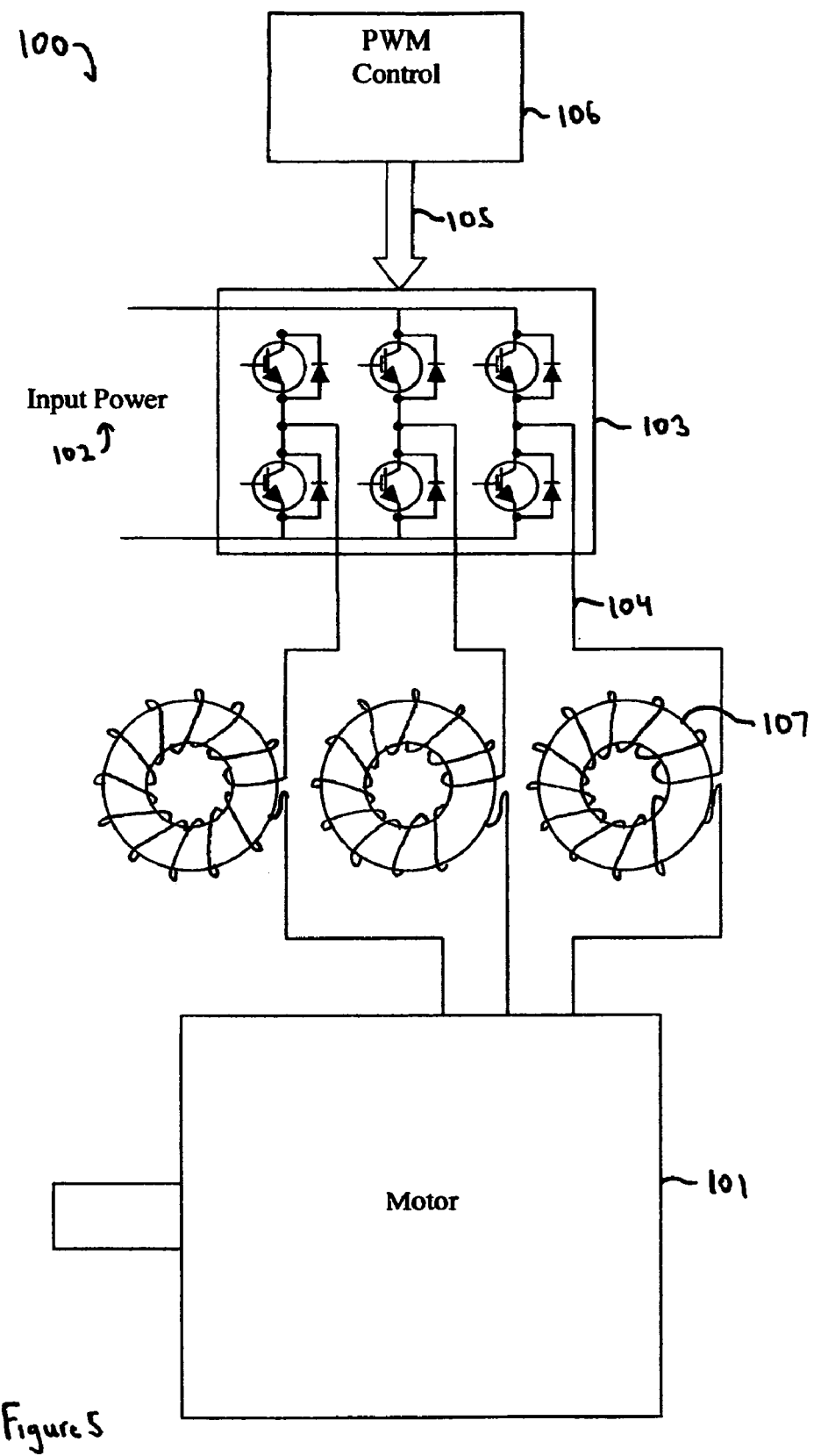
FIG. 5 is a schematic drawing of a high efficiency combination motor and electronic variable speed drive in accordance with the invention.

To overcome these losses, it has been found that inductors of particular construction and sizing can be effective while also not inducing larger losses in the inductors themselves. A high efficiency combination motor and electronic variable speed drive in accordance with the invention is shown in FIG. 5. The drive system 100 is comprised of a brushless permanent magnet air core motor 101 that is powered by input power 102. The input power 102 is coupled to the variable speed drive that utilizes and H-bridge topology to convert input power 104 to drive the motor 101. Although shown with BJT switches, other transistor types such as FETs or IGBTs can be utilized. To reduce the ripple current from the drive 103, three inductors 107 are serially electrically connected between the inverter 103 and the motor 101. The inductors, which can be quite large and greater than 6 inch diameter and 2 inch thickness each for a 40 hp air core motor, are highly efficient for the specific high current, high frequency and high inductance used for this type of motor so that the inductors do not add more losses than the small harmonic losses in the motor that are sought to be eliminated. Distributed gap inductors can be employed to accomplish this task and increase the efficiency of the combination of the motor with the electronic variable speed drive; Use of non-distributed gap cores can reduce the core losses, but they generate higher gap losses for the operating conditions. The inductors 107 are preferably powder core inductors instead of much more expensive high performance magnetic alloy tape wound cores that have discrete gaps. The variable speed drive 103 is commutated by control signals 105 from a pulse width modulation control board. To increase the reliability of the drive system, it is desirable to eliminate commutation sensors in the motor 101 that provide feedback to the drive inverter 103. To this end, the drive inverter preferably employs sensorless flux vector control to provide commutation of the synchronous AC power 104.

Figure 6:
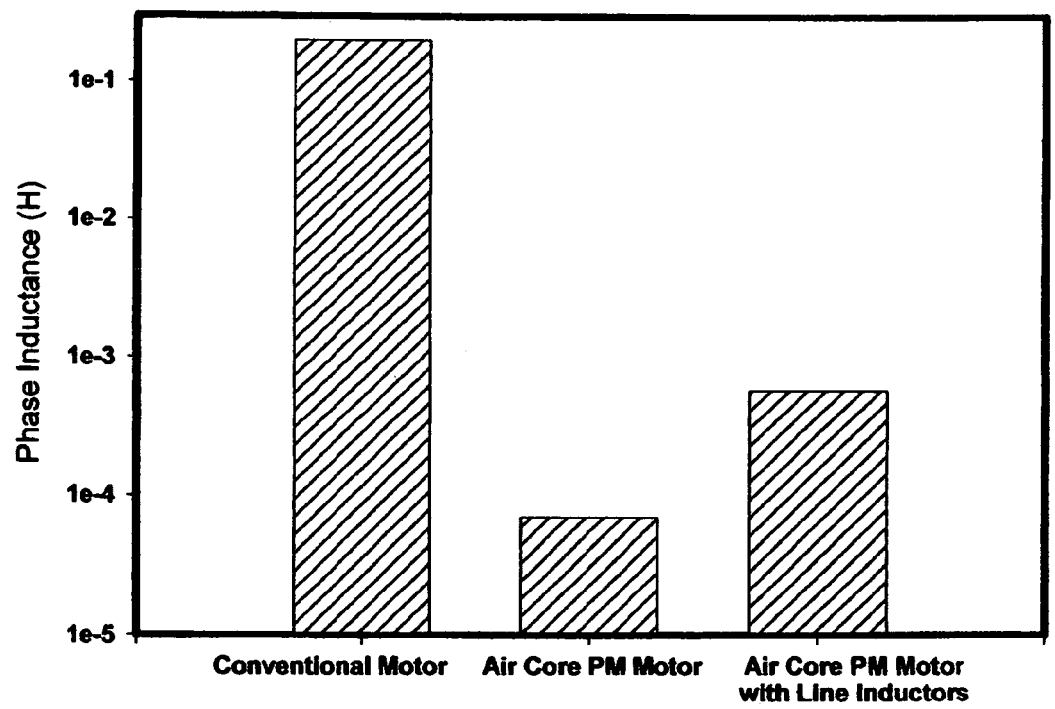
FIG. 6 is a log scale graph comparing motor winding phase inductance.

A comparison of motor winding phase inductance for conventional motors having armature windings in laminated iron core slots, and air core motors is shown in FIG. 6. Conventional slot wound motors provide over 1000 times higher inductance than an air core motor. The low inductance of the air core results in the higher ripple current and frequency that has been found to cause some rotor harmonic losses despite the large air gap and rotor magnets. To reduce these losses, the powder core inductors are serially connected between the electronic drive and armature windings of the motor. It has also been found that only a modest additional inductance is required to provide increased combination efficiency. The total inductance can still be over 100 times lower than a conventional motor. The smaller inductance combined with the ability to cost effectively utilize a high efficiency core material allows for the high efficiency of the combined motor and drive to be achieved.

Figure 7:
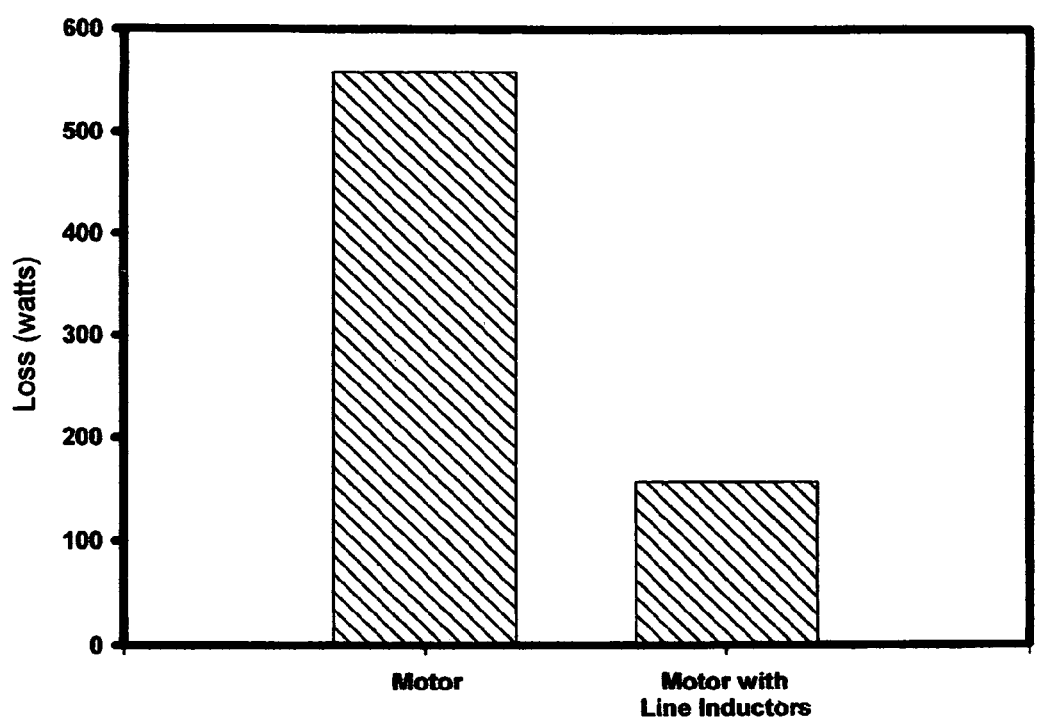
FIG. 7 is a graph comparing motor harmonic losses in a brushless air core permanent magnet motor.

The results of the invention are substantial. A comparison of motor harmonic losses in a brushless air core permanent magnet motor is shown in FIG. 7. Without the added powder core inductance, the losses are measured at 559 watts and with the added powder core inductance is 157 watts. One potential loss component in these current ripple induced harmonic losses is the generation of eddy currents in the rotor from the high frequency ripple magnetic fields from the adjacent air core armature driven by the high frequency drive ripple currents.

Figure 8:
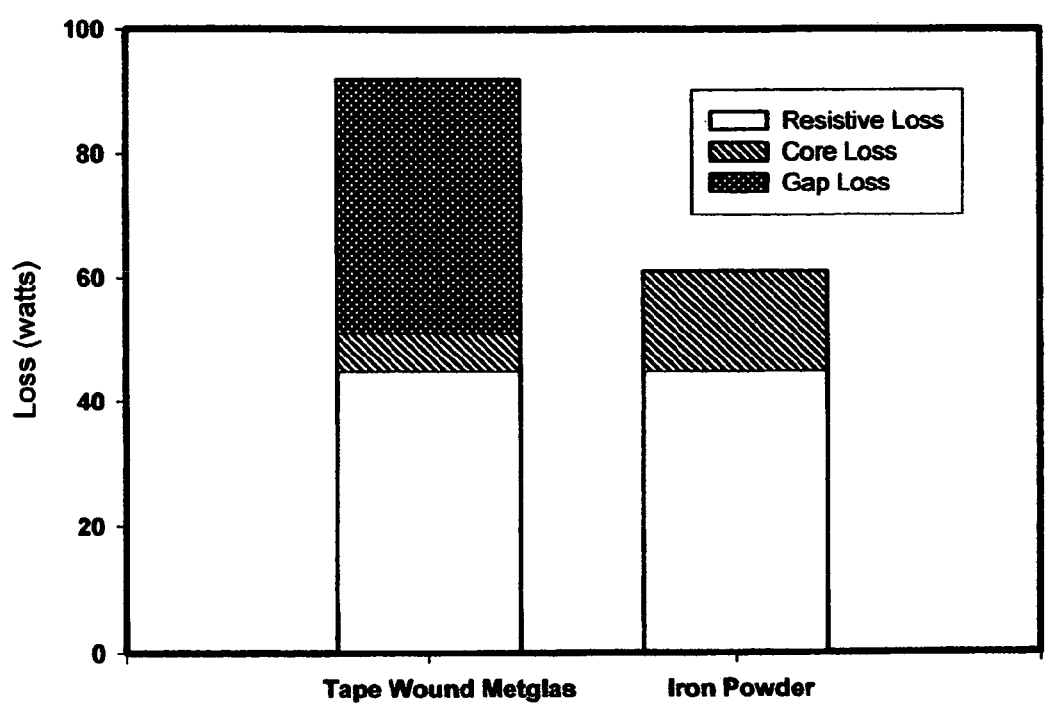
FIG. 8 is a graph comparing toroid inductor losses for use in accordance with the invention.
Figure 9:
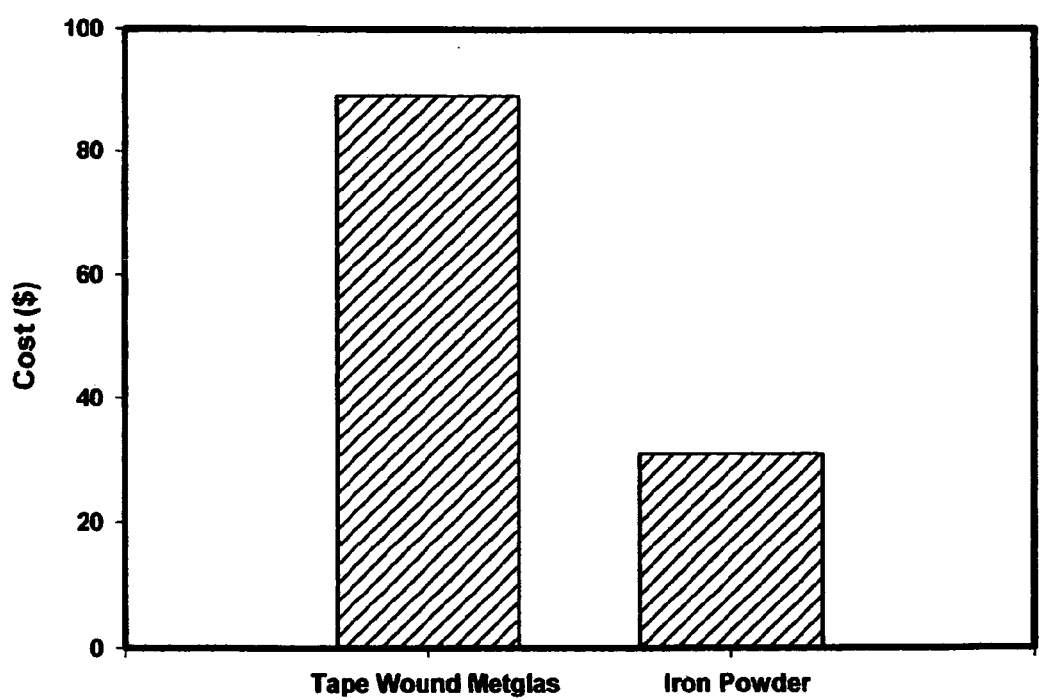
FIG. 9 is a graph comparing toroid inductor costs for use in accordance with the invention.

The advantageous use of distributed gap inductor cores to meet the specific requirements of an air core permanent magnet motor to pulse modulated drive can be seen over more expensive magnetic alloy tape cores. A comparison of toroid inductor losses for use in the drive system under the specific operating conditions with the invention are shown in FIG. 8. In both a tape alloy tape wound core and iron powder core, the resistive losses from the windings are about equal. The costly alloy tape wound core does show reduced core loss than the iron powder core. However, because of the required combination of high inductance with high current for this application, the tape wound core must have gaps cut to prevent the core from saturating. The combination of these gaps with the high frequency ripple current that arises form the PWM motor drive with low windings inductance, results in generation of substantial gap losses in the tape wound cores for this application. The powder core does not need gaps since it has an effectively distributed gap and hence can operate in this application without saturating. As a result, the iron powder cores do not have the gap losses and provide a significant increase in the drive system efficiency. This result also has been found to be beneficial economically. A comparison of toroid inductor costs for use in accordance with the invention. The iron powder inductor cores for use in the invention are nearly 70% lower in cost.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein

I claim:

1. A high efficiency combination motor and electronic variable speed drive comprising:
   a brushless permanent magnet motor that has a rotor and a stator, and an electronic drive inverter that drives said motor by providing synchronous AC power to said stator;
   said rotor comprising a ferromagnetic backiron and a circumferential array of alternating polarity magnetic poles on said backiron that drives magnetic flux back and forth across an armature air gap;
   said stator comprising an air core armature with three-phase windings comprised of bundled multiple individually insulated strand conductor wire, said windings are assembled together in a substantially non-ferromagnetic structure that is located in said armature air gap, whereby alternating magnetic flux from said alternating polarity magnetic poles passes through said windings as said rotor rotates;
   said inverter comprising a pulse modulated semiconductor H-bridge that switches and regulates power to said three-phase windings to accelerate said rotor;
   each of said three-phase armature windings is serially electrically connected to said H-bridge through one of three inductors respectively, said inductors having windings on a powder core, each said inductor providing an inductance that is at least twice the value of the leg inductance of said three-phase windings.

2. A high efficiency combination motor and electronic variable speed drive as described in claim 1 wherein:
   said inductors comprises windings that are wound around said powder core wherein said powder core is in the form of toroid.

3. A high efficiency combination motor and electronic variable speed drive as described in claim 2 wherein:
   said toroid is constructed of iron powder that is held together in an unsintered resin matrix.

4. A high efficiency combination motor and electronic variable speed drive as described in claim 1 wherein:
   said inductors adjust the full load peak value of ripple current to lie between $\frac{1}{4}^{th}$ and $\frac{1}{12}^{th}$ of the peak value of said synchronous AC power current.

5. A high efficiency combination motor and electronic variable speed drive as described in claim 4 wherein:
   said ripple current through said inductors from said H-bridge switching occurs at a frequency between 5 kHz and 50 kHz.

6. A high efficiency combination motor and electronic variable speed drive as described in claim 1 wherein:
   said inverter utilizes sensorless flux vector control to provide commutation of said synchronous AC power to said inductors and said air core armature.

7. A high efficiency combination motor and electronic variable speed drive comprising:
   a brushless permanent magnet motor that has a rotor and a stator, and an electronic drive inverter that drives said motor by providing synchronous AC power to said stator;
   said rotor comprising a ferromagnetic backiron and a circumferential array of alternating polarity magnetic poles on said rotating backiron that drives magnetic flux back and forth across an armature air gap;
   said stator comprising an air core armature with three-phase windings that are assembled together in a substantially non-ferromagnetic structure that is located in said armature air gap, whereby alternating magnetic flux from said alternating polarity magnetic poles passes through said windings as said rotor rotates;
   said inverter comprising a pulse modulated semiconductor H-bridge that switches and regulates power to said three-phase windings to accelerate said rotor;
   said H-bridge is serially electrically connected to said three-phase armature windings through use of three inductors with distributed gap cores, wherein said inductors increase the total efficiency of the combination motor and electronic variable speed drive by reducing the ripple current induced losses generated in said rotor, each said inductor providing an inductance that is at least twice the value of the leg inductance of said three-phase windings.

8. A high efficiency combination motor and electronic variable speed drive as described in claim 7 wherein:
   said inductors have windings that are wound around said powder core, wherein said powder core is in the form of toroid.

9. A high efficiency combination motor and electronic variable speed drive as described in claim 8 wherein:
   said toroid is constructed of iron powder that is held together in an unsintered polymer resin matrix.

10. A high efficiency combination motor and electronic variable speed drive as described in claim 7 wherein:

said inductors adjust the full load peak value of ripple current to lie between $\frac{1}{4}^{th}$ and $\frac{1}{12}^{th}$ of the peak value of said synchronous AC power current.

11. A high efficiency combination motor and electronic variable speed drive as described in claim 10 wherein:

said ripple current through said inductors from said H-bridge switching occurs at a frequency between 5 kHz and 50 kHz.

12. A high efficiency combination motor and electronic variable speed drive as described in claim 7 wherein:

said inverter utilizes sensorless flux vector control to provide commutation of said synchronous AC power to said inductors and said air core armature.

13. A high efficiency combination motor and electronic variable speed drive as described in claim 7 wherein:

said alternating polarity magnetic poles employ radial magnetizations and said windings traverse axially in said armature air gap, wherein said brushless permanent magnet motor operates with a radial armature air gap.

14. A high efficiency combination motor and electronic variable speed drive comprising:

a brushless permanent magnet motor that has a rotor and a stator, and an electronic drive inverter that drives said motor by providing synchronous AC power to said stator;

said rotor includes two spaced apart ferromagnetic rotor portions together defining therebetween an armature air gap, and a circumferential array of alternating polarity magnetic poles on said ferromagnetic rotor portions that drive magnetic flux back and forth across said armature air gap;

said stator comprising an air core armature with three-phase windings comprised of bundled multiple individually insulated strand conductor wire, said windings are assembled together in a substantially non-ferromagnetic structure that is located in said armature air gap, whereby alternating magnetic flux from said alternating polarity magnetic poles passes through said windings as said rotor rotates;

said inverter includes a pulse modulated semiconductor H-bridge that switches and regulates power to said three-phase windings to accelerate said rotor;

said H-bridge is serially electrically connected to said three-phase armature windings through three inductors with windings on a powder core, each said inductor providing an inductance that is greater than the value of the leg inductance of said three-phase windings.

15. A high efficiency combination motor and electronic variable speed drive as described in claim 14 wherein:

said inductors comprises windings that are wound around said powder core wherein said powder core is in the form of toroid.

16. A high efficiency combination motor and electronic variable speed drive as described in claim 15 wherein:

said toroid is constructed of iron powder that is held together in an unsintered resin matrix.

17. A high efficiency combination motor and electronic variable speed drive as described in claim 14 wherein:

said inductors adjust the full load peak value of ripple current to lie between $\frac{1}{4}^{th}$ and $\frac{1}{12}^{th}$ of the peak value of said synchronous AC power current.

18. A high efficiency combination motor and electronic variable speed drive as described in claim 17 wherein:

said ripple current through said inductors from said H-bridge switching occurs at a frequency between 5 kHz and 50 kHz.

19. A high efficiency combination motor and electronic variable speed drive as described in claim 14 wherein:

said inverter utilizes sensorless flux vector control to provide commutation of said synchronous AC power to said inductors and said air core armature.

20. A high efficiency combination motor and electronic variable speed drive as described in claim 14 wherein:

said alternating polarity magnetic poles employ radial magnetizations and said windings traverse axially in said armature air gap, wherein said brushless permanent magnet motor operates with a radial armature air gap.

* * * * *